(12) United States Patent
Fink et al.

(10) Patent No.: US 6,776,580 B2
(45) Date of Patent: Aug. 17, 2004

(54) VARIABLE EDGE ROTOR BLADE

(75) Inventors: David Allen Fink, Melrose, MA (US); Marcel Pierre Joseph Gaudreau, Lexington, MA (US)

(73) Assignee: Diversified Technologies, Inc., Bedford, MA (US)

( * ) Notice: Subject to any disclaimer, the term of this patent is extended or adjusted under 35 U.S.C. 154(b) by 0 days.

(21) Appl. No.: 09/957,839

(22) Filed: Sep. 21, 2001

(65) Prior Publication Data

US 2002/0076325 A1 Jun. 20, 2002

Related U.S. Application Data

(60) Provisional application No. 60/234,594, filed on Sep. 22, 2000, and provisional application No. 60/294,127, filed on May 29, 2001.

(51) Int. Cl.⁷ ............................................. B64C 11/28
(52) U.S. Cl. ........................................ 416/23; 416/155
(58) Field of Search ................... 41/23, 24, 3, 155; 415/104; 244/214, 17.25, 123

(56) References Cited

U.S. PATENT DOCUMENTS

| 3,451,644 A | 6/1969 | Marchetti et al. ............ 244/7 A |
| 6,076,776 A | * 6/2000 | Breitbach et al. ............ 244/219 |
| 6,371,415 B1 | * 4/2002 | Lorkowski et al. ......... 244/214 |

* cited by examiner

Primary Examiner—Edward K. Look
Assistant Examiner—Dwayne J. White
(74) Attorney, Agent, or Firm—Iandiorio & Teska

(57) ABSTRACT

A variable edge rotor blade adapted to be driven by the rotor hub includes an airfoil section; a movable edge section coupled to the airfoil section, and an actuator device operating independently of the hub, disposed in the blade proximate the movable edge section, fixed to the airfoil section and coupled to the movable edge section for oscillating it between an increased lift and decreased lift position.

56 Claims, 11 Drawing Sheets

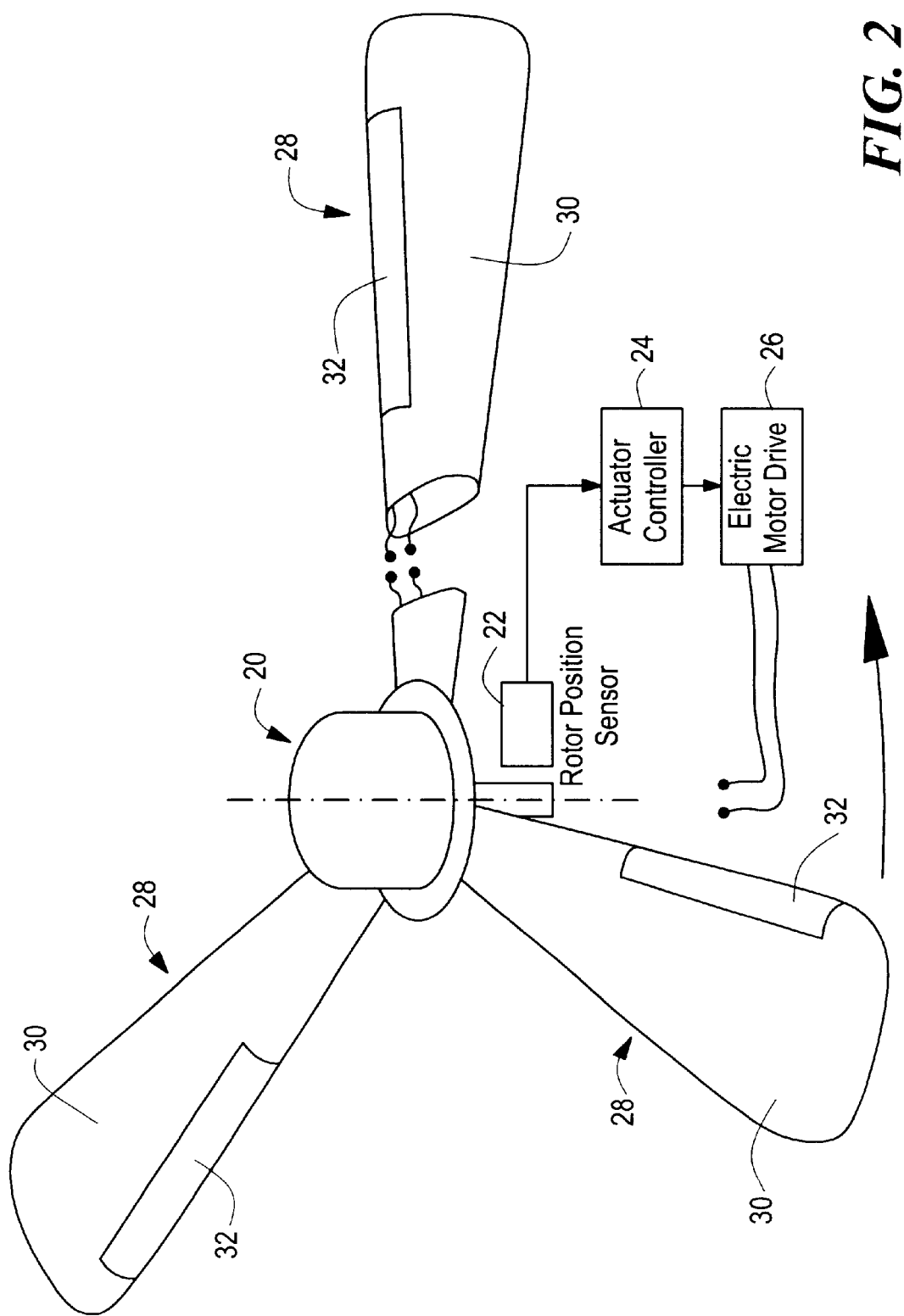

VARIABLE EDGE ROTOR BLADE

RELATED APPLICATIONS

This application claims priority of and incorporates by reference U.S. Provisional Application Ser. No. 60/234,594 filed Sep. 22, 2000 and entitled VARIABLE GEOMETRY HIGH-LIFT AIRFOIL FOR ROTORCRAFT and U.S. Provisional Application Ser. No. 60/294,127 filed May 29, 2001 entitled VARIABLE GEOMETRY HIGH-LIFT AIRFOIL FOR ROTORCRAFT.

GOVERNMENT RIGHTS

This invention was made with U.S. Government support under Contract No. DAAH10-01-C0008 awarded by the U.S. Army. The government may have rights in the subject invention.

FIELD OF THE INVENTION

This invention relates to a variable edge rotor blade and more particularly to such a variable edge blade in which the actuator is contained in the blade and operates independently of the hub.

BACKGROUND OF THE INVENTION

Army rotorcraft are being called upon to operate in much more demanding environments than in the past, particularly in areas of nap-of-the earth (NOE), deep-penetration, and air-to-air combat. Highly maneuverable, agile, and survivable rotorcraft demand greater aerodynamic capability from the rotor system. Aerodynamic performance is currently limited, to a great degree, by the low maximum lift coefficient of conventional rotor blade airfoils, and conflicting airfoil shape requirements of the advancing and retreating blade at high speed. Retreating blades optimally have round large radius high-cambered leading edge type airfoils to achieve a high lift coefficient. In contrast, advancing blades optimally have thin, low-cambered airfoils to avoid high shock loss and drag penalties.

One attempt to solve this problem resulted in an airfoil with a fixed camber at a compromise angle at the leading edge of the airfoil. The fixed camber at a compromise angle provides a small benefit for advancing blades, but proved to be a hindrance for retreating blades.

Another attempt involved controlling the flaps of a blade through a complex system which includes a swash plate and an axle which carries, for each blade, an articulation connected to a system of rods which comprises a crank-arm hinged on a sealer in contact with the swash plate. The crank-arm actuates a counter member which causes a rod connected to a flap to pivot. However, such a complex system which is connected to the hub adds a significant amount of weight, and increases aerodynamic drag. Additionally, the number of components necessary in such a complex system from the hub to the flap renders the system susceptible to reliability and maintenance concerns.

BRIEF SUMMARY OF THE INVENTION

It is therefore an object of this invention to provide a rotorcraft with an improved variable edge rotor blade.

It is a further object of this invention to provide an improved variable edge rotor blade in which the edge angle can be varied as the blade rotates to increase the stall angle of attack, lift, speed, payload, and maneuverability.

It is a further object of this invention to provide an improved variable edge rotor blade of less complexity and lighter in weight.

It is a further object of this invention to provide such an improved variable edge rotor blade in which the variable edge actuator is contained in the blade and operates independently of the hub.

It is a further object of this invention to provide such an improved variable edge rotor blade which is simple in design, which uses fewer components, and is operable at higher g forces.

It is a further object of this invention to provide such an improved variable edge rotor blade which contributes to reduced fuel consumption, higher cruise speeds, reduced vibration, and improved component life and maintenance.

The invention results from the realization that a simpler variable edge rotor blade with increased performance can be achieved with an actuator that operates independently of the hub and is contained in the blade fixed to the airfoil section proximate the movable edge section and coupled to the movable edge section for oscillating it between greater and lesser lift positions.

This invention features a variable edge rotor blade adapted to be driven by the rotor hub including an airfoil section and a movable edge section coupled to the airfoil section. An actuator operating independently of the hub, disposed in the blade proximate the movable edge section and fixed to the airfoil section, is coupled to the movable edge section for oscillating the movable edge section between an increased lift and decreased lift position.

In a preferred embodiment the movable edge section may include a deflectable contour member connected with the airfoil section. The movable edge section may include an edge element pivotably connected to the airfoil section. The edge element may include first and second ends, the first end being pivotably connected to the airfoil section and the second end abutting the airfoil section. The second end may alternately confront and recede from the airfoil section creating a gap.

The movable edge section may include a contour member conforming to the airfoil section and connected to one of the airfoil section and the movable edge section. The contour member may be deflectable and coupled to at least one of the airfoil and movable edge sections. The actuator device may include a reciprocating member coupled to the movable edge section and a motor for driving the reciprocating member.

The actuator device may include a magnet on one of the movable edge section and airfoil section and an electromagnetic coil coupled to the other and an alternating power source for energizing the coil to oscillate the movable edge section. The movable edge section may be the leading edge of the rotor blade. The deflectable contour member may be stretchable. The coil may be fixed to the airfoil section and the magnet fixed to the movable edge section. The coil may be fixed to the movable edge section and the magnet may be fixed to the airfoil section. The coil may be flexible and fixed to the airfoil section and the movable edge section as well. The gap may be filled with a flexible material. The edge element may be pivotably connected to the airfoil section by a torsion bar. The reciprocating member may be hinged to the movable edge section or it may be fixed to the movable edge section.

The movable edge section may include a deflectable contour member coupled to the airfoil section, and the actuator device may include a shaper bar between the airfoil section and the contour member and a mechanism coupled to the shaper bar for moving the shaper bar to change the shape of the contour member.

This invention also features a variable edge rotor blade adjusted to be driven by a rotor hub including an airfoil section and a movable edge section including an edge element having a first end and a second end and coupled to said airfoil section. The first end is pivotably connected to the airfoil section and the second end abuts the airfoil section. The movable edge section also includes a contour member conforming to the airfoil section and the edge element and connected to either the airfoil section or the edge element, proximate the second end of the edge element. There is an actuator device operating independently of the hub, disposed in the blade proximate the edge element, fixed to the airfoil section and coupled to the edge element for oscillating the edge element between an increased lift and decreased lift position.

This invention also features a variable edge rotor blade adjusted to be driven by a rotor hub including an airfoil section and a movable edge section including an edge element having a first end and a second end and coupled to the airfoil section. The first end of the movable edge section is pivotably connected to the airfoil section and the second end abuts the airfoil section. The movable edge section also includes a contour member conforming to the airfoil section and the edge element, the contour member connected to the airfoil section. An actuator device operates independently of the hub and is disposed in the blade proximate the movable edge section, fixed to the airfoil section and coupled to the edge element for oscillating the edge element between an increased lift and decreased lift position.

This invention also features a variable edge rotor blade adapted to be driven by the rotor hub including an airfoil section and a movable edge section coupled to the airfoil section including a deflectable contour member coupled to the airfoil section. An actuator device operates independently of the hub and is disposed in the blade proximate the movable edge section, fixed to the airfoil section and coupled to the movable edge section for oscillating the movable edge section between an increased lift and decreased lift position. The actuator device includes a shaper bar between the airfoil section and the contour member and a mechanism coupled to the shaper bar for moving the shaper bar to change the shape of the contour member.

BRIEF DESCRIPTION OF THE DRAWINGS

Other objects, features and advantages will occur to those skilled in the art from the following description of a preferred embodiment and the accompanying drawings, in which:

FIG. 2 is a diagrammatic, three dimensional view of a rotor rotor hub and variable edge blades according to this invention;

PREFERRED EMBODIMENT

Figure 1:
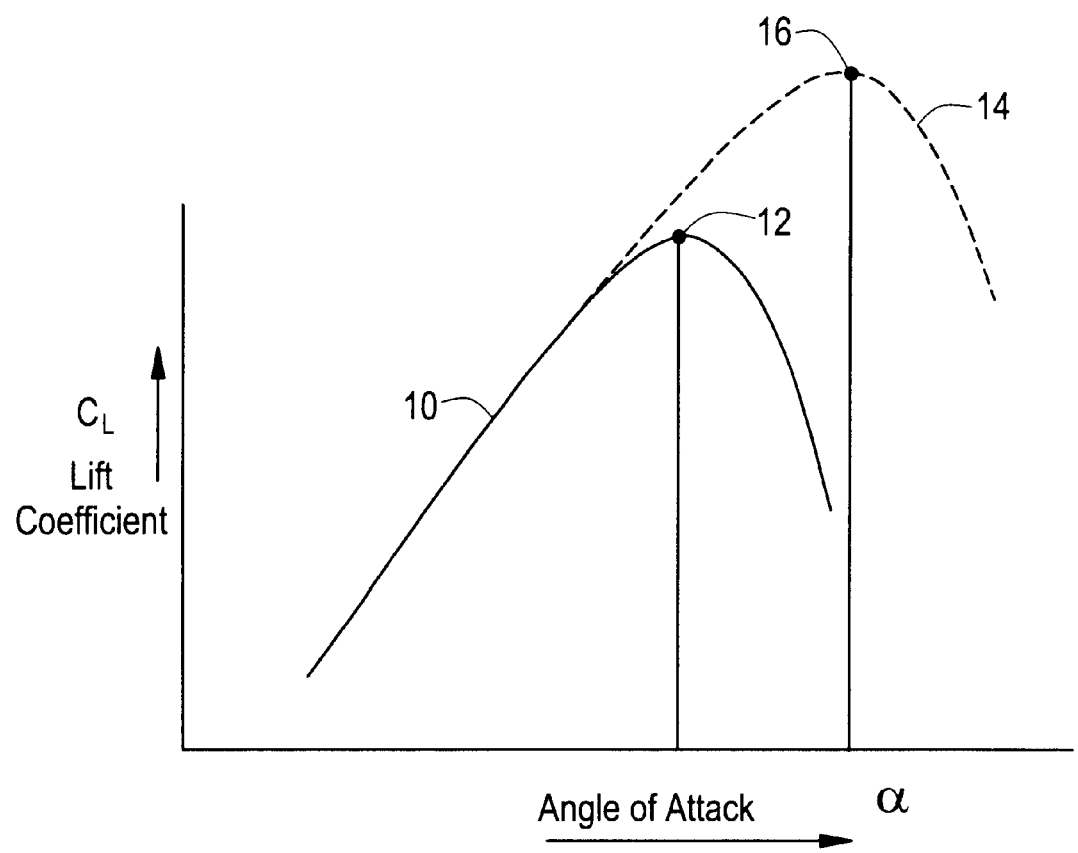
FIG. 1 is a graph showing the variation of lift coefficient compared to the angle of attack for a conventional rotor blade and also a blade with variable edge according to this invention.

As discussed in the background section above, aerodynamic performance of a rotor system is limited by a low maximum lift coefficient of conventional rotor blades. As the angle of attack 10, FIG. 1, of a conventional rotor blade increases, the lift coefficient increases, to a maximum angle of attack 12, at which point a conventional rotor will stall. However, the variable edge rotor blade of the present invention allows the angle of attack 14 to reach an increased maximum angle of attack 16 which is greater than the maximum angle of attack 12 of conventional rotor blades. The increased maximum angle of attack provides a greater lift coefficient than that of conventional rotor blades, and is particularly useful in helicopters.

As shown in FIG. 2, rotor hub 20 includes rotor position sensor 22, actuator controller 24, and an electronic motor drive 26, which drives the leading edge section of blades 28, which are connected to hub 20.

Figure 3A:
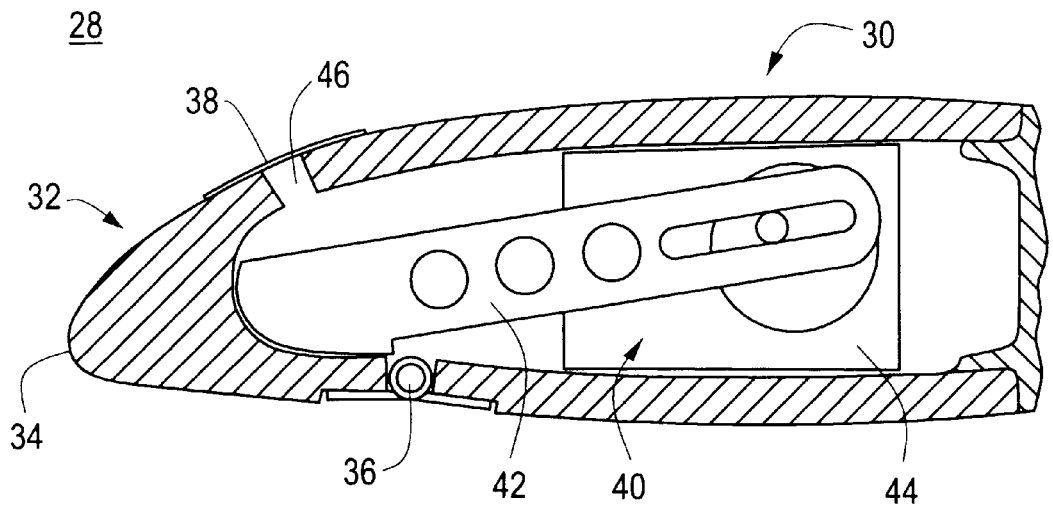
FIGS. 3A and B are side elevational sectional views with portions broken away showing an embodiment of this invention incorporating a reciprocating arm fixed to the movable edge section in two different positions.
Figure 3B:
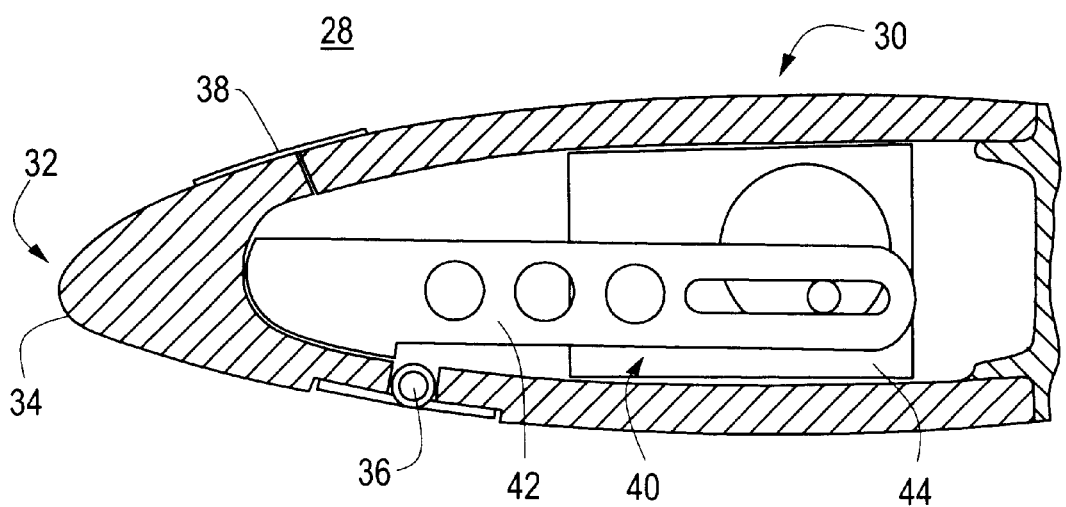

Typically, each variable edge rotor blade 28 of the subject invention includes airfoil section 30, and movable edge section 32 coupled to airfoil section 30. Movable edge section 32, FIGS. 3A and 3B, includes edge element 34 which is pivotably connected to airfoil section 30 by hinge 36, and contour member 38 which conforms to airfoil section 30 and is coupled to edge element 34. FIG. 3A shows movable edge section 32 in a cambered or drooped position, while FIG. 3B shows movable edge section in an uncambered, or undrooped position. In this embodiment, movable edge section 32 is shown to be the leading edge of blade 28, although movable edge section 32 can also be the trailing edge of blade 28.

Figure 4A:
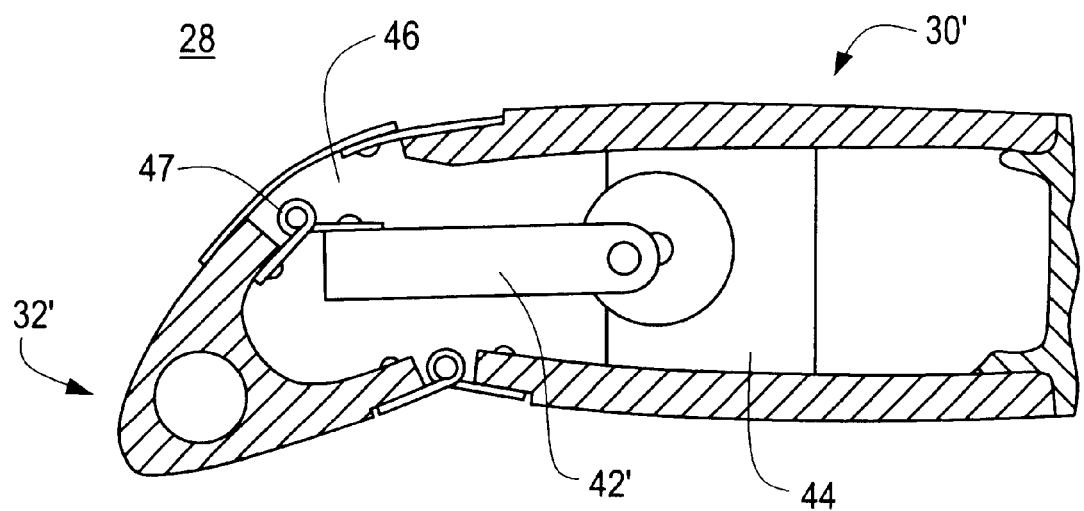
FIGS. 4A and B are views similar to FIGS. 3A and B of another embodiment of the invention in which the reciprocating arm is hinged to the movable edge section.
Figure 4B:
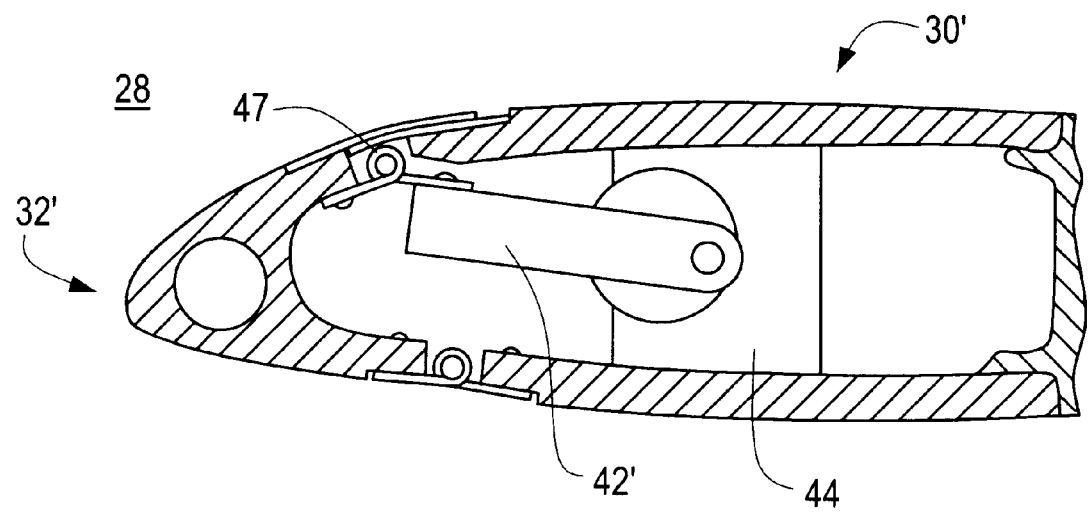

Actuator device 40 is disposed in blade 28 proximate movable edge section 32 and is fixed to airfoil section 30 and coupled to movable edge section 32. Thus, actuator device 40 operates independently of hub 20, FIG. 2. Actuator device 40 is preferably electromagnetic, although the present invention is not limited to electromagnetic actuators. Actuator device 40, in this example, includes reciprocating member 42, which is coupled to motor 44 in airfoil section 30 and connected to moveable edge section 32. As shown in FIGS. 4A and 4B, reciprocating member 42' can be hingedly connected to moveable edge section 32'.

Figure 10:
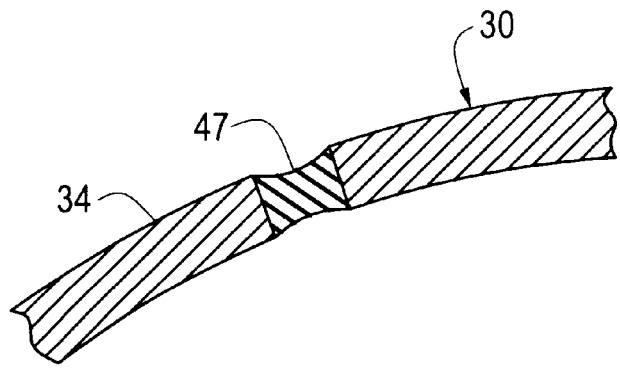
FIG. 10 is a schematic, sectional broken away view of the gap between the movable and airfoil sections filled with a resilient material.
Figure 11A:
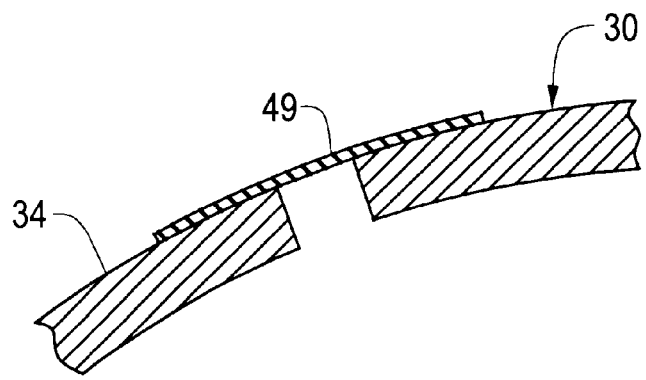
FIGS. 11A and B are views similar to FIG. 10 in which the gap is covered by a stretchable material shown in expanded and contracted positions.
Figure 11B:
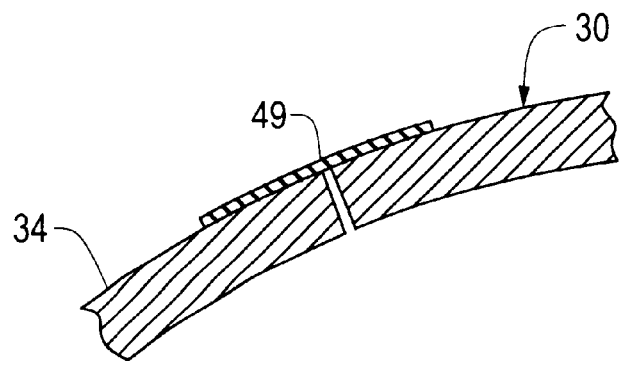

In operation, motor 44 drives reciprocating member 42 forward, which in turn drives moveable edge section 32 to recede from airfoil section 30 into a cambered position, FIGS. 3A and 4A. As moveable edge section 32 recedes from airfoil section 30, gap 46 is formed. Gap 46 is covered by contour member 38 which conforms to airfoil section 30 to prevent anything from entering into gap 46. Additionally, gap 46 may be filled with resilient or flexible material 47, FIG. 10. Alternatively, gap 46 may be covered by a resilient or stretchable material 49, FIGS. 11A and 11B, which is connected to both edge element 34 and airfoil section 30.

As reciprocating member 42 continues to be driven by motor 44, reciprocating member 42 withdraws into airfoil section 30, which drives moveable edge section 32 to confront airfoil section 30 in an uncambered position, FIGS. 3B and 4B. In this manner, movable edge section 32 oscillates between an increased lift position and a decreased lift position such that movable edge section 32 becomes a variable edge which cambers when blade 28 retreats, FIGS. 3A and 4A and returns to its uncambered position when blade 28 advances, FIGS. 3B and 4B. Preferably, the edge of the blade varies between the cambered and uncambered positions at 1/rev to minimize the 1/rev blade harmonic. This increases the maximum lift coefficient of blade 28 which substantially increases the available lift capability and reduces or eliminates stall problems.

Figure 5A:
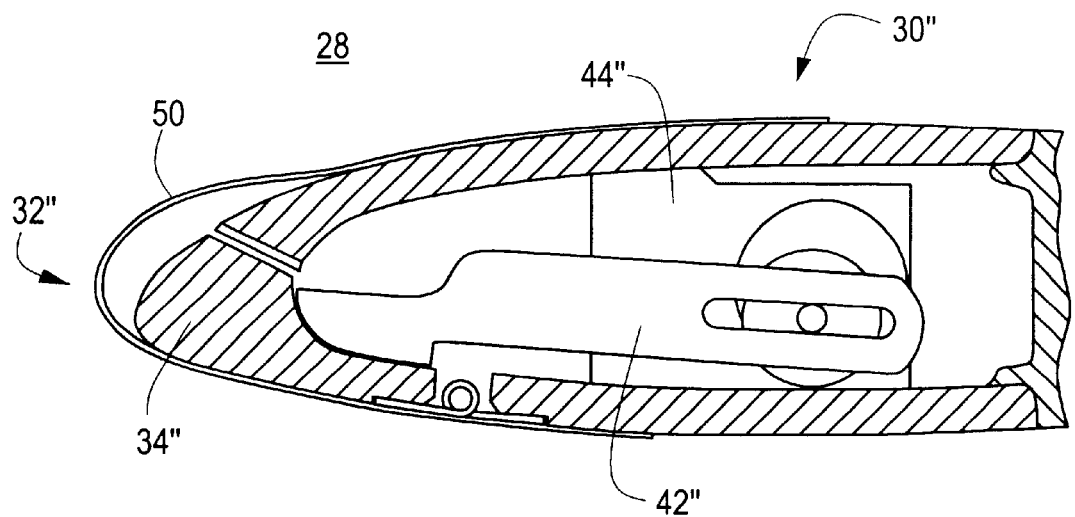
FIGS. 5A and B are views similar to FIGS. 4A and B of yet another embodiment of the invention in which the contour plate is deflectable and attached to both the airfoil section and movable edge section.
Figure 5B:
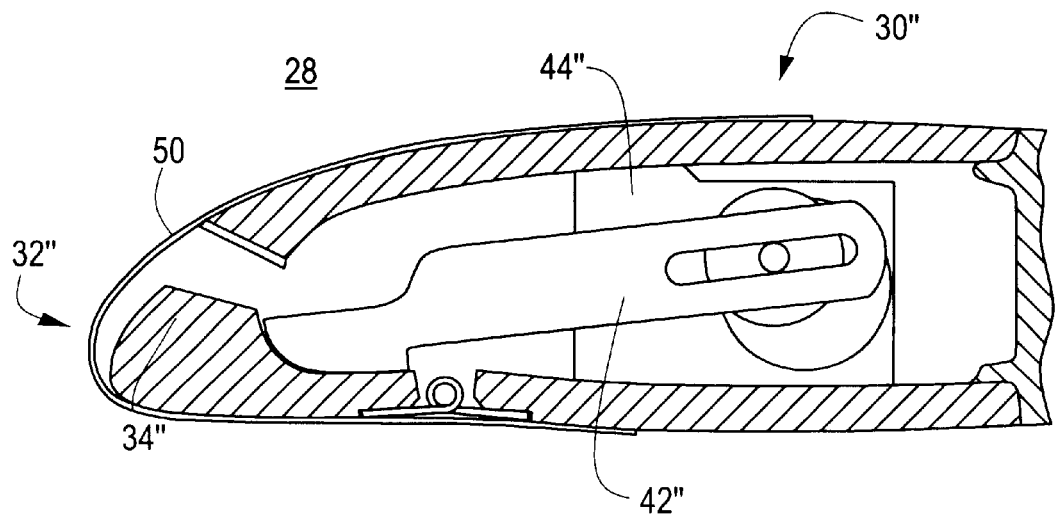

In an alternate embodiment of the present invention, movable edge section 32", FIGS. 5A and 5B, includes contour member 50, which is deflectable and conforms to airfoil section 30". Contour member 50 is coupled to airfoil section 30" and may be coupled to movable edge section 32". When reciprocating member 42" is driven by motor 44", edge element 34" is driven into contour member 50, which causes contour member 50 to deflect such that moveable edge section 32" cambers, FIG. 5B. Accordingly, moveable edge section 32" is in an increased lift position. When reciprocating member 42" recedes, edge element 34" confronts airfoil section 30", which allows contour member 50 to relax back to its original shape. Accordingly, moveable edge section 32" uncambers and returns to its decreased lift position, FIG. 5A.

Figure 6A:
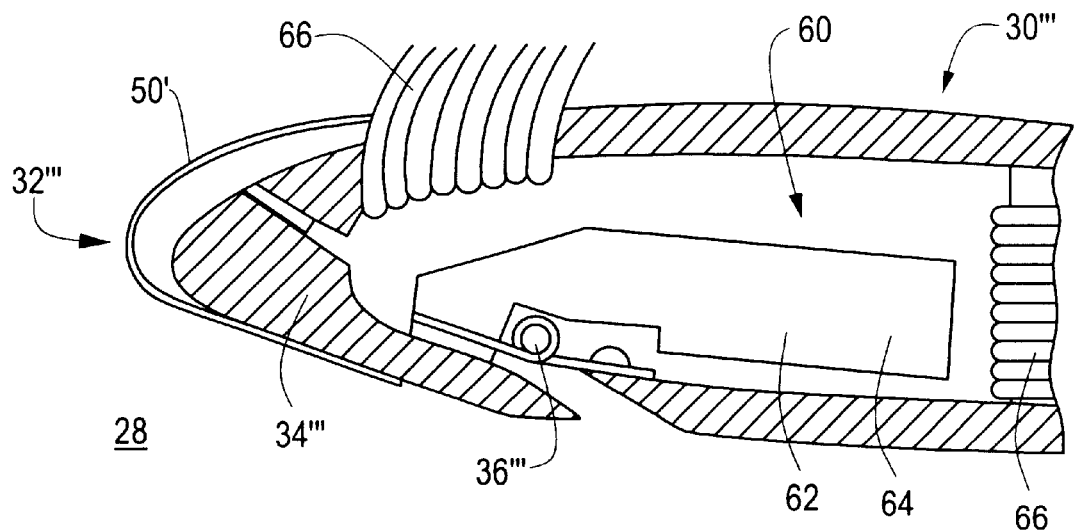
FIGS. 6A and B are views similar to FIGS. 5A and B of still another embodiment of the invention in which the actuator device includes a magnet and coil.
Figure 6B:
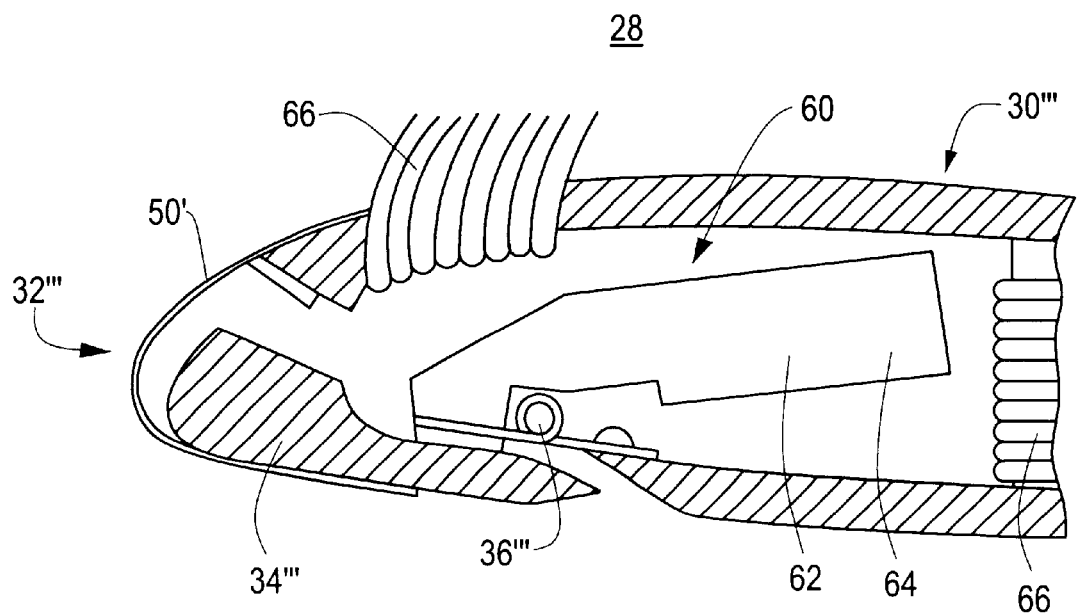
Figure 7A:
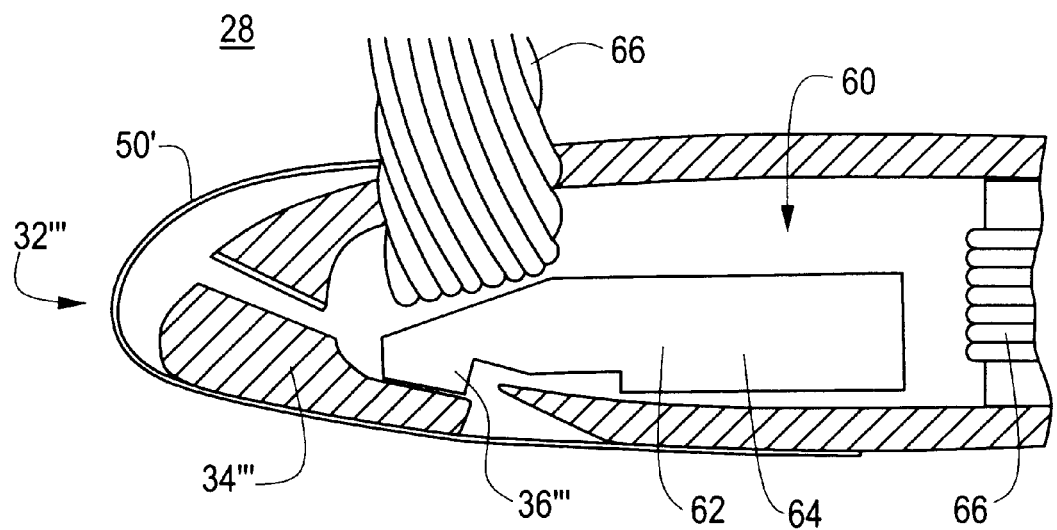
FIGS. 7A and B are views similar to FIGS. 6A and B in which the pivoting hinge is replaced by a flexible element.
Figure 7B:
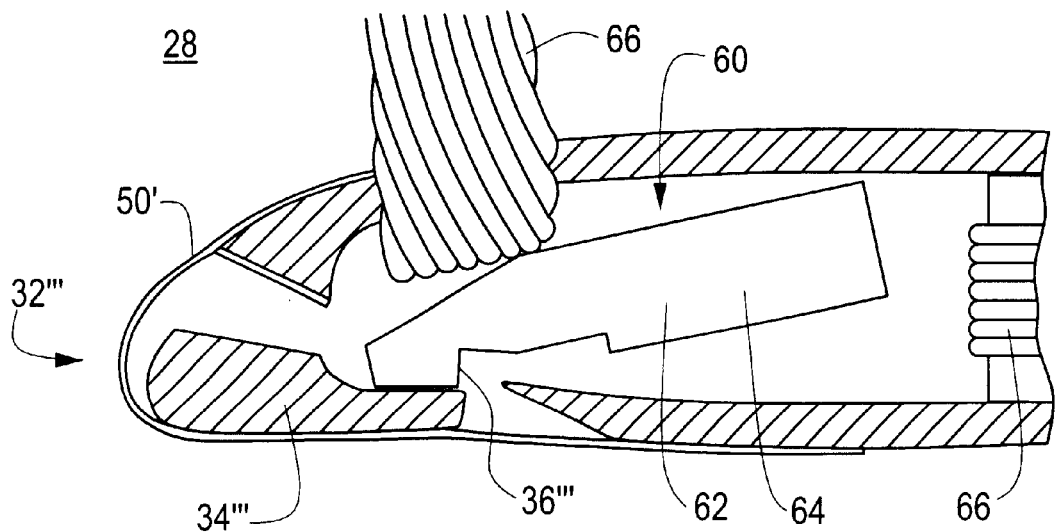
Figure 12:
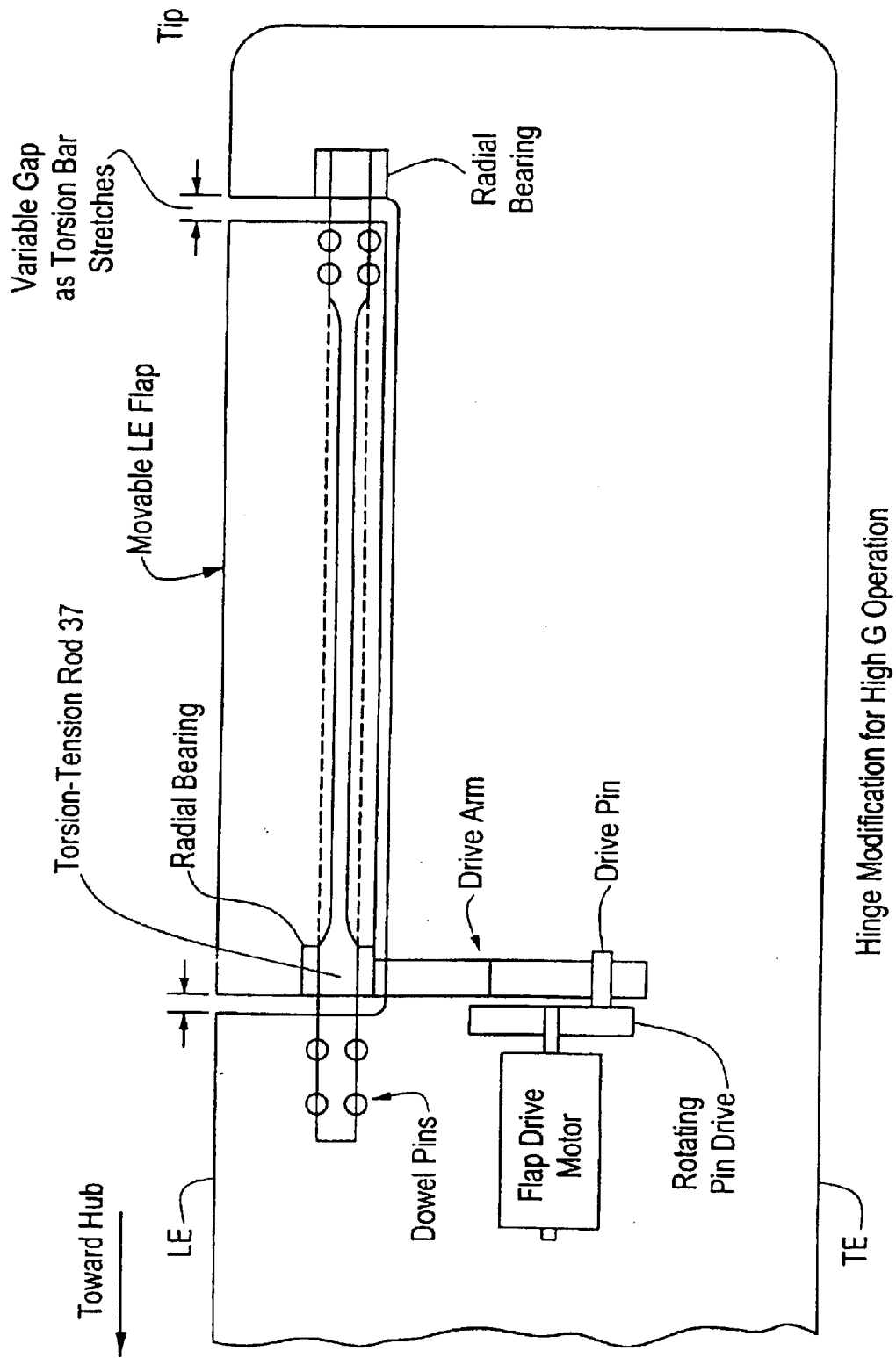
FIG. 12 is a schematic diagram of any one of the variable edge blades of the previous figures with a torsion bar replacing the hinge.

There are numerous types of actuators which may be used in the present invention. For example, the actuator device of the aforementioned embodiments may be replaced with magnet and coil actuator device 60, FIGS. 6A–6B. Actuator device 60 includes magnet carrier 62, which contains magnet 64. Magnet carrier 62 is coupled to movable edge section 32''', and edge element 34''' particularly, by hinge 36'''. Electromagnetic coil 66 is coupled to airfoil section 30''' and is connected to an alternating power source which energizes electromagnetic coil 66. Energized electromagnetic coil 66 causes magnet carrier 62, and edge element 34''' to oscillate, which deflects contour member 50''' such that moveable edge section 32''' oscillates between a cambered position, FIG. 6B, and an uncambered position, FIG. 6A. Hinge 36, 36" and 36''' in any of the above embodiments can be replaced with torsion rod 37, FIG. 12. In an alternate embodiment, hinge 36''' may be a flexible element or sheet hinge, FIGS. 7A and 7B.

Figure 8A:
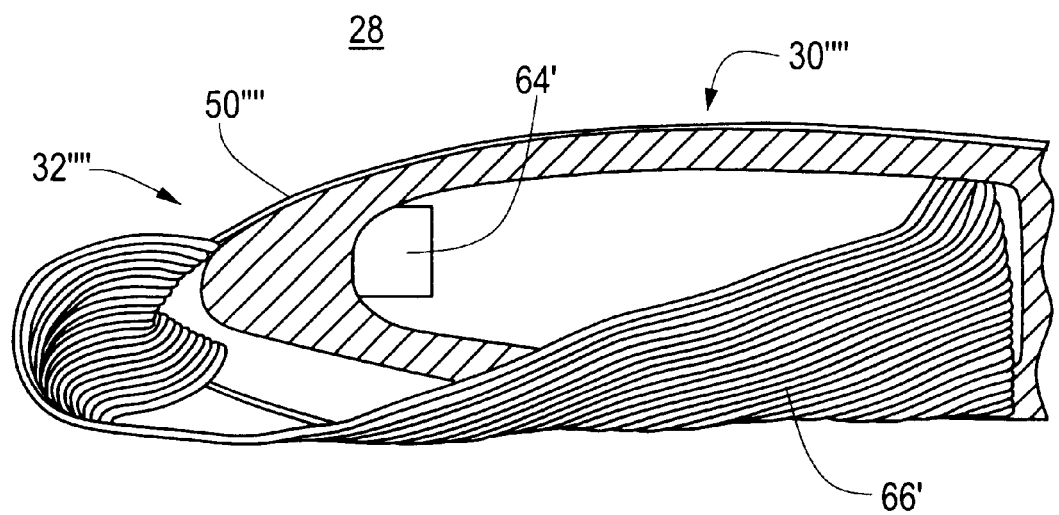
FIGS. 8A and B are views similar to FIGS. 7A and B in which the coil is flexible and attached to both the airfoil section and movable section.
Figure 8B:
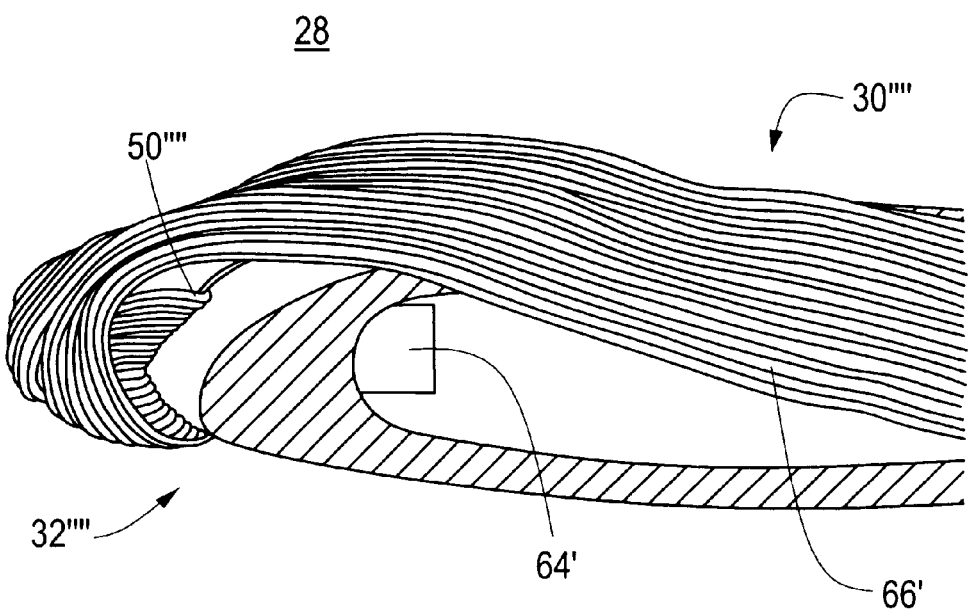

In yet another embodiment of the present invention, electromagnetic coil 66' may be flexible and fixed to moveable edge section 32"", while magnet 64" is fixed to airfoil section 30"", FIGS. 8A and 8B. In this embodiment, energizing electromagnetic coil 66' directly oscillates and deflects contour member 50"".

Figure 9A:
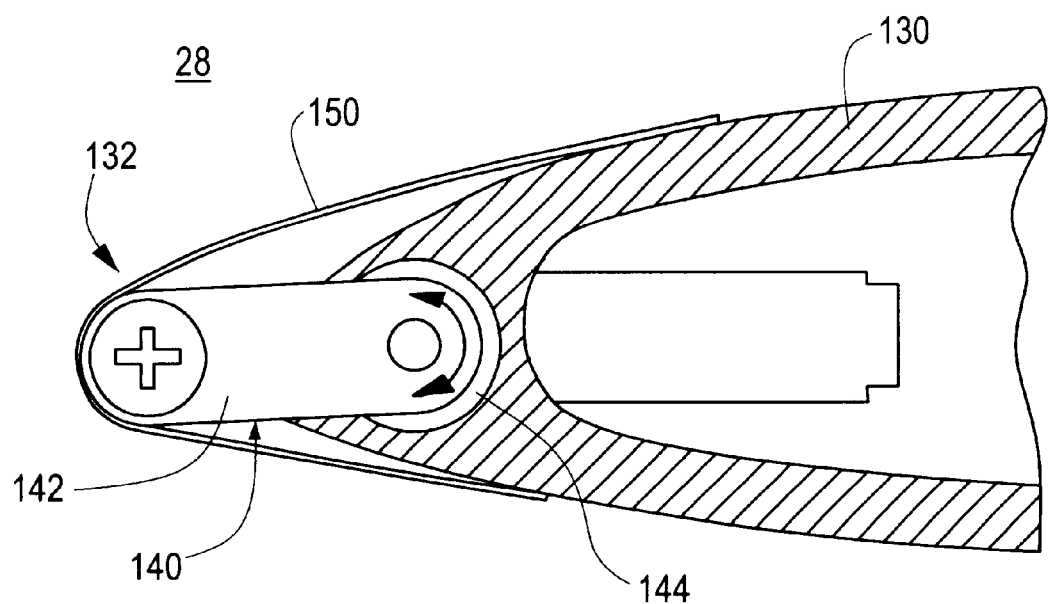
FIGS. 9A and B are views similar to FIGS. 8A and B in which a reciprocating arm actuator device directly drives a deflectable movable section.
Figure 9B:
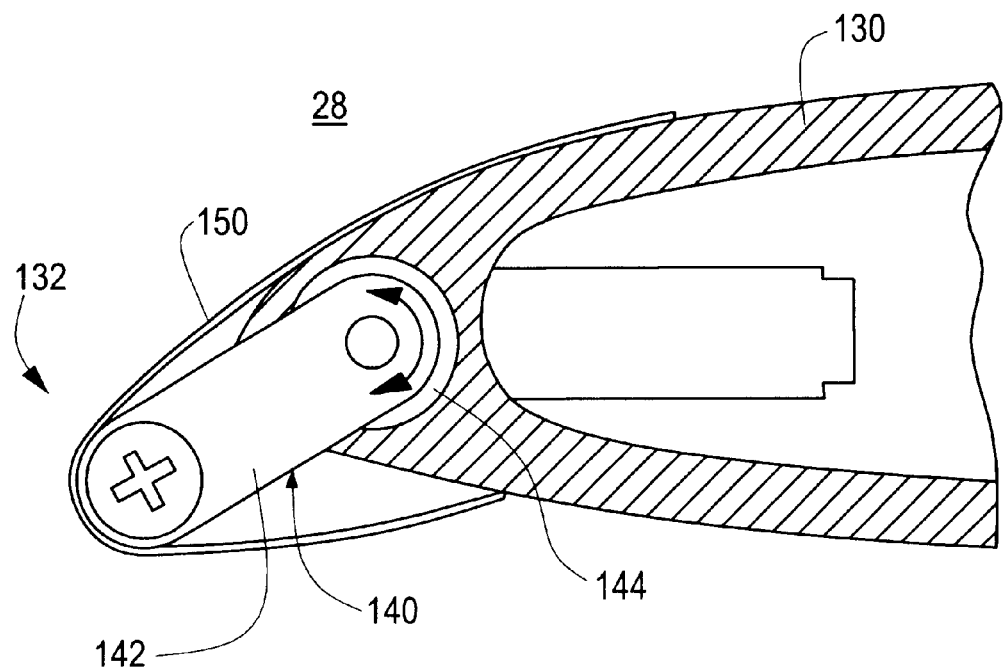

In a further embodiment of the present invention, movable edge section 132, FIGS. 9A and 9B, includes deflectable contour member 150 coupled to airfoil section 130. Actuator device 140 includes shaper bar 142 disposed between airfoil section 130 and contour member 150. Motor 144 is coupled to shaper bar 142 for moving shaper bar 142 to deflect contour member 150, and create the variable edge of blade 128.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

Other embodiments will occur to those skilled in the art and are within the following claims:

What is claimed is:

1. A variable edge rotor blade adapted to be driven by the rotor hub comprising:
   an airfoil section;
   a movable edge section coupled to said airfoil section; and
   an electromagnetic actuator device operating independently of the hub, disposed in the blade proximate the movable edge section, fixed to the airfoil section and coupled to the movable edge section for oscillating the movable edge section between an increased lift and decreased lift position.

2. The variable edge rotor blade of claim 1 in which said movable edge section is the leading edge of the rotor blade.

3. The variable edge rotor blade of claim 1 in which said movable edge section includes a deflectable contour member coupled to said airfoil section, and said actuator device includes a shaper bar between said airfoil section and said contour member and a mechanism coupled to said shaper bar for moving said shaper bar to change the shape of said contour member.

4. The variable edge rotor blade of claim 1 in which said movable edge section includes a deflectable contour member connected with the airfoil section.

5. The variable edge rotor blade of claim 4 in which said deflectable contour member is stretchable.

6. The variable edge rotor blade of claim 1 in which said movable edge section includes an edge element pivotably connected to the airfoil section.

7. The variable edge rotor blade of claim 6 which said edge element includes first and second ends, said first end being pivotably connected to said airfoil section and said second end abutting the airfoil section.

8. The variable edge rotor blade of claim 7 in which said second end alternately confronts and recedes from the airfoil section creating a gap.

9. The variable edge rotor blade of claim 8 in which said gap is filled with a flexible material.

10. The variable edge rotor blade of claim 8 in which said movable edge section includes a contour member conforming to the airfoil section and connected to one of the airfoil sections and the movable edge section.

11. The variable edge rotor blade of claim 10 in which said contour member is deflectable and coupled to at least one of the airfoil and movable edge sections.

12. The variable edge rotor blade of claim 10 in which said edge element is pivotably connected to said airfoil section by a torsion bar.

13. The variable edge rotor blade of claim 1 in which said actuator device includes a reciprocating member coupled to said movable edge section and a motor for driving said reciprocating member.

14. The variable edge rotor blade of claim 13 in which said reciprocating member is hinged to said movable edge section.

15. The variable edge rotor blade of claim 13 in which said reciprocating member is fixed to said movable edge section.

16. The variable edge rotor blade of claim 1 in which said actuator device includes a magnet on one of said movable edge section and said airfoil section, and an electromagnetic coil coupled to the other and an alternating power source for energizing said coil to oscillate said movable edge section.

17. The variable edge rotor blade of claim 16 in which said coil is fixed to said airfoil section and said magnet is fixed to said movable edge section.

18. The variable edge rotor blade of claim 16 in which said coil is fixed to said movable edge section and said magnet is fixed to said airfoil section.

19. The variable edge rotor blade of claim 18 in which said coil is flexible and is also fixed to said airfoil section.

20. A variable edge rotor blade adjusted to be driven by a rotor hub comprising:
    an airfoil section;
    a movable edge section including:
        an edge element having a first end and a second end and coupled to said airfoil section, said first end pivotably connected to said airfoil section and said second end abutting said airfoil section; and
        a contour member conforming to the airfoil section and the edge element and connected to either said airfoil section or said edge element, proximate the second end of said edge element; and
    an electromagnetic actuator device operating independently of the hub, disposed in the blade proximate the edge element, fixed to the airfoil section and coupled to the edge element for oscillating the edge element between an increased lift and decreased lift position.

21. The variable edge rotor blade of claim 20 in which said actuator device includes a magnet on one of said edge element and said airfoil section, and an electromagnetic coil coupled to the other and an alternating power source for energizing said coil to oscillate said edge element.

22. The variable edge rotor blade of claim 21 in which said coil is fixed to said airfoil section and said magnet is fixed to said edge element.

23. The variable edge rotor blade of claim 20 in which said edge element is the leading edge of the rotor blades.

24. The variable edge rotor blade of claim 20 in which said edge element is pivotably connected to said airfoil section by a torsion bar.

25. The variable edge rotor blade of claim 20 in which said reciprocating member is fixed to said edge element.

26. The variable edge rotor blade of claim 21 in which said coil is fixed to said edge element and said magnet is fixed to said airfoil section.

27. The variable edge rotor blade of claim 26 in which said coil is flexible and is also fixed to said airfoil section.

28. The variable edge rotor blade of claim 20 in which said second end alternately confronts and recedes from the airfoil section creating a gap.

29. The variable edge rotor blade of claim 28 in which said gap is filled with a flexible material.

30. The variable edge rotor blade of claim 20 in which said actuator device includes a reciprocating member coupled to said edge element and a motor for driving said reciprocating member.

31. The variable edge rotor blade of claim 30 in which said reciprocating member is hinged to said edge element.

32. A variable edge rotor blade adjusted to be driven by a rotor hub comprising:
    an airfoil section;
    a movable edge section including:
        an edge element having a first end and a second end and coupled to said airfoil section, said first end pivotably connected to said airfoil section and said second end abutting said airfoil section; and
        a contour member conforming to the airfoil section and the edge element, said contour member connected to the airfoil section; and
    an electromagnetic actuator device operating independently of the hub, disposed in the blade proximate the movable edge section, fixed to the airfoil section and coupled to the edge element for oscillating the edge element between an increased lift and decreased lift position.

33. The variable edge rotor blade of claim 32 in which said edge element is the leading edge of the rotor blades.

34. The variable edge rotor blade of claim 32 in which said edge element is pivotably connected to said airfoil section by a torsion bar.

35. The variable edge rotor blade of claim 32 in which said reciprocating member is fixed to said edge element.

36. The variable edge rotor blade of claim 32 in which said contour member is deflectable.

37. The variable edge rotor blade of claim 36 in which said deflectable contour member is stretchable.

38. The variable edge rotor blade of claim 32 in which said actuator device includes a reciprocating member coupled to said edge element and a motor for driving said reciprocating member.

39. The variable edge rotor blade of claim 38 in which said reciprocating member is hinged to said edge element.

40. The variable edge rotor blade of claim 32 in which said actuator device includes a magnet on one of said edge element and said airfoil section, and an electromagnetic coil coupled to the other and an alternating power source for energizing said coil to oscillate said edge element.

41. The variable edge rotor blade of claim 40 in which said coil is fixed to said airfoil section and said magnet is fixed to said edge element.

42. The variable edge rotor blade of claim 40 in which said coil is fixed to said edge element and said magnet is fixed to said airfoil section.

43. The variable edge rotor blade of claim 42 in which said coil is flexible and is also fixed to said airfoil section.

44. The variable edge rotor blade of claim 32 in which said second end alternately confronts and recedes from the airfoil section creating a gap.

45. The variable edge rotor blade of claim 44 in which said gap is filled with a flexible material.

46. A variable edge rotor blade adapted to be driven by the rotor hub comprising:
    an airfoil section;
    a movable edge section coupled to said airfoil section including a deflectable contour member coupled to said airfoil section; and
    an actuator device operating independently of the hub, disposed in the blade proximate the movable edge section, fixed to the airfoil section and coupled to the movable edge section for oscillating the movable edge section between an increased lift and decreased lift position, said actuator device including a shaper bar between said airfoil section and said contour member and a mechanism coupled to said shaper bar for moving said shaper bar to change the shape of said contour member.

47. A variable edge rotor blade adjusted to be driven by a rotor hub comprising:
an airfoil section;
a movable edge section including:
an edge element having a first end and a second end and coupled to said airfoil section, said first end pivotably connected to said airfoil section and said second end abutting said airfoil section, said second end alternately confronting and receding from the airfoil section creating a gap; and
a deflectable contour member conforming to the airfoil section coupled to at least said airfoil section or said movable edge section; and
an actuator device operating independently of the hub, disposed in the blade proximate the edge element, fixed to the airfoil section and coupled to the edge element for oscillating the edge element between an increased lift and decreased lift position.

48. A variable edge rotor blade adapted to be driven by the rotor hub comprising:
an airfoil section;
a movable edge section coupled to said airfoil section, said movable edge section including a deflectable, stretchable contour member connected with the airfoil section; and
an actuator device operating independently of the hub, disposed in the blade proximate the movable edge section, fixed to the airfoil section and coupled to the movable edge section for oscillating the movable edge section between an increased lift and decreased lift position.

49. A variable edge rotor blade adjusted to be driven by a rotor hub comprising:
an airfoil section;
a movable edge section including:
an edge element having a first end and a second end and coupled to said airfoil section, said first end pivotably connected to said airfoil section and said second end abutting said airfoil section, said second end alternately confronting and receding from the airfoil section creating a gap, said gap filed with a flexible material; and
a contour member conforming to the airfoil section and the edge element and connected to either said airfoil section or said edge element, proximate the second end of said edge element; and
an actuator device operating independently of the hub, disposed in the blade proximate the edge element, fixed to the airfoil section and coupled to the edge element for oscillating the edge element between an increased lift and decreased lift position.

50. A variable edge rotor blade adjusted to be driven by a rotor hub comprising:
an airfoil section;
a movable edge section including:
an edge element having a first end and a second end and coupled to said airfoil section, said first end pivotably connected to said airfoil section by a torsion bar and said second end abutting said airfoil section; and
a contour member conforming to the airfoil section and the edge element and connected to either said airfoil section or said edge element, proximate the second end of said edge element; and
an actuator device operating independently of the hub, disposed in the blade proximate the edge element, fixed to the airfoil section and coupled to the edge element for oscillating the edge element between an increased lift and decreased lift position.

51. A variable edge rotor blade adjusted to be driven by a rotor hub comprising:
an airfoil section;
a movable edge section including:
an edge element having a first end and a second end and coupled to said airfoil section, said first end pivotably connected to said airfoil section and said second end abutting said airfoil section; and
a deflectable, stretchable contour member conforming to the airfoil section and the edge element, said contour member connected to the airfoil section; and
an actuator device operating independently of the hub, disposed in the blade proximate the movable edge section, fixed to the airfoil section and coupled to the edge element for oscillating the edge element between an increased lift and decreased lift position.

52. A variable edge rotor blade adjusted to be driven by a rotor hub comprising:
an airfoil section;
a movable edge section including:
an edge element having a first end and a second end and coupled to said airfoil section, said first end pivotably connected to said airfoil section and said second end abutting said airfoil section, said second end alternately confronting and receding from the airfoil section creating a gap, said gap filled with a flexible material; and
a contour member conforming to the airfoil section and the edge element, said contour member connected to the airfoil section; and
an actuator device operating independently of the hub, disposed in the blade proximate the movable edge section, fixed to the airfoil section and coupled to the edge element for oscillating the edge element between an increased lift and decreased lift position.

53. A variable edge rotor blade adjusted to be driven by a rotor hub comprising:
an airfoil section;
a movable edge section including:
an edge element having a first end and a second end and coupled to said airfoil section, said first end pivotably connected to said airfoil section by a torsion bar and said second end abutting said airfoil section; and
a contour member conforming to the airfoil section and the edge element, said contour member connected to the airfoil section; and
an actuator device operating independently of the hub, disposed in the blade proximate the movable edge section, fixed to the airfoil section and coupled to the edge element for oscillating the edge element between an increased lift and decreased lift position.

54. A variable edge rotor blade adapted to be driven by the rotor hub comprising:
an airfoil section;
a movable edge section coupled to said airfoil section; and
an actuator device operating independently of the hub, disposed in the blade proximate the movable edge section, fixed to the airfoil section and coupled to the movable edge section for oscillating the movable edge section between an increased lift and decreased lift position, said actuator device including a magnet on one of said movable edge section and said airfoil section, and an electromagnetic coil coupled to the other and an alternating power source for energizing said coil to oscillate said movable edge section.

55. A variable edge rotor blade adjusted to be driven by a rotor hub comprising:

an airfoil section;

a movable edge section including:
- an edge element having a first end and a second end and coupled to said airfoil section, said first end pivotably connected to said airfoil section and said second end abutting said airfoil section; and
- a contour member conforming to the airfoil section and the edge element and connected to either said airfoil section or said edge element, proximate the second end of said edge element; and an actuator device operating independently of the hub, disposed in the blade proximate the edge element, fixed to the airfoil section and coupled to the edge element for oscillating the edge element between an increased lift and decreased lift position, said actuator device including a magnet on one side of said edge element and said airfoil section, and an electromagnetic coil coupled to the other and an alternating power source for energizing said coil to oscillate said edge element.

56. A variable edge rotor blade adjusted to be driven by a rotor hub comprising:

an airfoil section;

a movable edge section including:
- an edge element having a first end and a second end and coupled to said airfoil section, said first end pivotably connected to said airfoil section and said second end abutting said airfoil section; and
- a contour member conforming to the airfoil section and the edge element, said contour member connected to the airfoil section; and an actuator device operating independently of the hub, disposed in the blade proximate the movable edge section, fixed to the airfoil section and coupled to the edge element for oscillating the edge element between an increased lift and decreased lift position, said actuator device including a magnet on one of said edge element and said airfoil section, and an electromagnetic coil coupled to the other and an alternating power source for energizing said coil to oscillate said edge element.

* * * * *